US012725790B2

(12) United States Patent
Chen et al.

(10) Patent No.: US 12,725,790 B2
(45) Date of Patent: Sep. 1, 2026

(54) METHOD FOR MANUFACTURING NEGATIVE ELECTRODE MATERIAL PARTICLES

(71) Applicant: CPC CORPORATION, TAIWAN, Kaohsiung City (TW)

(72) Inventors: Yan-Shi Chen, Chiayi City (TW); Yan-Xiong Liao, Chiayi City (TW)

(73) Assignee: CPC CORPORATION, TAIWAN, Kaohsiung City (TW)

( * ) Notice: Subject to any disclaimer, the term of this patent is extended or adjusted under 35 U.S.C. 154(b) by 0 days.

(21) Appl. No.: 18/624,433

(22) Filed: Apr. 2, 2024

(65) Prior Publication Data

US 2025/0246604 A1 Jul. 31, 2025

(30) Foreign Application Priority Data

Jan. 25, 2024 (TW) ................................ 113102979

(51) Int. Cl.

*H01M 4/36* (2006.01)
*C01B 33/18* (2006.01)
*H01M 4/48* (2010.01)
*H01M 4/587* (2010.01)

(52) U.S. Cl.

CPC ............. *H01M 4/366* (2013.01); *C01B 33/18* (2013.01); *H01M 4/48* (2013.01); *H01M 4/587* (2013.01); *C01P 2002/72* (2013.01); *C01P 2002/82* (2013.01); *C01P 2004/61* (2013.01); *C01P 2004/80* (2013.01); *C01P 2006/40* (2013.01)

(58) Field of Classification Search

CPC ........ H01M 4/366; H01M 4/48; H01M 4/587; C01B 33/18

See application file for complete search history.

(56) References Cited

U.S. PATENT DOCUMENTS

| | | | | |
|---|---|---|---|---|
| 2017/0040610 | A1* | 2/2017 | Otsuka | H01M 4/38 |
| 2019/0221835 | A1* | 7/2019 | Imaji | H01M 10/0525 |
| 2020/0365884 | A1* | 11/2020 | Yasuda | H01M 4/483 |
| 2022/0328816 | A1* | 10/2022 | Deng | H01M 4/483 |
| 2023/0080961 | A1* | 3/2023 | McKinney | H01M 4/366 252/182.1 |

FOREIGN PATENT DOCUMENTS

| | | | |
|---|---|---|---|
| JP | 2015106563 A * | 6/2015 | H01M 10/052 |
| TW | I636614 B | 9/2018 | |

* cited by examiner

*Primary Examiner* — Nathan H Empie
(74) *Attorney, Agent, or Firm* — HSML P.C.

(57) ABSTRACT

A method for manufacturing negative electrode material particles includes the steps of: mixing silicon oxide granules with a powder of a pitch without using any liquid organic solvents, so as to obtain a mixture; and heating the mixture at a heating rate ranging from 0.65° C./min to 1.25° C./min to a carbonization temperature of not lower than 600° C. for not less than 5 hours, so that the thus melted pitch is carbonized and forms a carbon film on a surface of each of the silicon oxide granules, thereby obtaining the negative electrode material particles. Each of the negative electrode material particles has a mean particle size ranging from 2 μm to 11 μm.

3 Claims, 7 Drawing Sheets

METHOD FOR MANUFACTURING NEGATIVE ELECTRODE MATERIAL PARTICLES

CROSS-REFERENCE TO RELATED APPLICATION

This application claims priority to Taiwanese Invention Patent Application No. 113102979, filed on Jan. 25, 2024, the entire disclosure of which is incorporated by reference herein.

FIELD

The present disclosure relates to a method for manufacturing a silicon-based negative electrode material, and more particularly to a method for manufacturing negative electrode material particles. Each of the negative electrode material particles is a silicon oxide granule coated with a carbon film.

BACKGROUND

Lithium-ion secondary batteries are currently the predominant choice among the various types of secondary batteries available for general consumer use. It is well-known that common positive electrode materials for these lithium-ion secondary batteries include lithium cobalt oxide ($LiCoO_2$, abbreviated as LCO), lithium iron phosphate ($LiFePO_4$, abbreviated as LFP), and lithium manganese oxide ($LiMn_2O_4$, abbreviated as LMO), and common negative electrode materials for these lithium-ion secondary batteries include the conventional carbon-based materials and silicon-based materials developed in recent years.

TW 1636614 B discloses a method for manufacturing a carbon-coated silicon/silicon carbide (Si/SiC) composite active material. The method of TW 1636614 B includes the following steps in sequence: (A) mixing silicon, silicon carbide (SiC), and acetone, followed by ultrasonic oscillation, so as to obtain a silicon/silicon carbide (Si/SiC) material; (B) stirring a ground pitch and acetone until the ground pitch is dissolved in acetone so as to obtain a pitch material; (C) stirring the silicon/silicon carbide (Si/SiC) material and the pitch material so as to obtain a first mixture; (D) subjecting the first mixture to ultrasonic oscillation; (E) simultaneously stirring the first mixture and performing suction filtration; (F) after performing steps (D) and (E), heating the first mixture at a temperature ranging from 600° C. to 1200° C. for a duration ranging from 1 hour to 12 hours; and (G) gradually cooling the first mixture to room temperature so as to obtain the carbon-coated silicon/silicon carbide (Si/SiC) composite active material.

The carbon-coated silicon/silicon carbide (Si/SiC) composite active material manufactured by the method of TW 1636614 B can be applied as a negative electrode material for the lithium-ion secondary batteries. However, in order to coat a carbon film on a surface of the silicon/silicon carbide (Si/SiC) material, the manufacturing method of TW 1636614 B requires complete dissolution of the ground pitch in acetone to obtain the pitch material, followed by stirring the pitch material with the silicon/silicon carbide (Si/SiC) material. In addition, in step (E), the suction filtration must be applied to the first mixture. From the point of view of the material cost and time required for such manufacturing method, the use of acetone not only increases the material cost but also is time-consuming due to various procedures such as ground pitch dissolution, ultrasonic oscillation, stirring, and suction filtration. Furthermore, the manufacturing method of TW 1636614 B includes dissolving the ground pitch by means of acetone, causing difficulty to achieve the effect of mass production.

In view of the aforesaid, there is still a need to develop an effective way for manufacturing a silicon-based negative electrode material to minimize the associated material and time costs.

SUMMARY

Therefore, an object of the present disclosure is to provide a method for manufacturing negative electrode material particles, which can alleviate at least one of the drawbacks of the prior art.

According to the present disclosure, the method includes the steps of:

(a) mixing silicon oxide granules with a powder of a pitch without using any liquid organic solvents, so as to obtain a mixture; and (b) heating the mixture at a heating rate ranging from 0.65° C./min to 1.25° C./min to a carbonization temperature of not lower than 600° C. for not less than 5 hours, so that the thus melted pitch is carbonized and forms a carbon film on a surface of each of the silicon oxide granules, thereby obtaining the negative electrode material particles.

Each of the negative electrode material particles has a mean particle size ranging from 2 μm to 11 μm.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figures 1, 2:
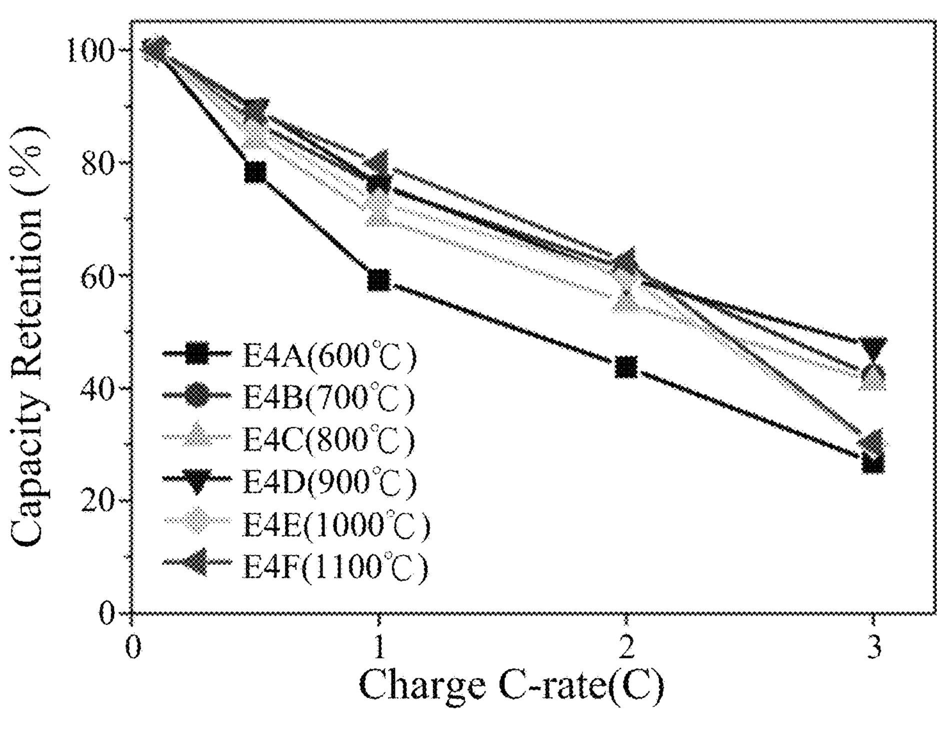
FIG. 1 is a graph showing the relationship between the capacity retention and the charge C-rate for CR2032 half-cells of E4A, E4B, E4C, E4D, E4E, and E4F, infra.
FIG. 2 is a graph showing the relationship between the capacity retention and the discharge C-rate for CR2032 half-cells of E4A, E4B, E4C, E4D, E4E, and E4F, infra.

For the purpose of this specification, it will be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Taiwan or any other country.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a method for manufacturing negative electrode material particles, which includes the following steps (a) and (b).

In step (a), silicon oxide granules are mixed with a powder of a pitch without using any liquid organic solvents, so as to obtain a mixture. In certain embodiments, in step (a), the pitch has a D10 particle size ranging from 0.5 μm to 2.0 μm, a D50 particle size ranging from 2 μm to 4 μm, and a D90 particle size ranging from 5 μm to 9 μm.

In step (b), the mixture is heated at a heating rate ranging from 0.65° C./min to 1.25° C./min to a carbonization temperature of not lower than 600° C. for not less than 5 hours, so that the thus melted pitch is carbonized and forms a carbon film on a surface of each of the silicon oxide granules, thereby obtaining the negative electrode material particles.

It should be noted that the purpose of heating the mixture at the specified heating rate to the carbonization temperature for not less than 5 hours is to enable the pitch to gradually soften as the temperature increases to allow the pitch to reach its softening point, and then the thus softened pitch is melted to reduce viscosity thereof, such that there would be sufficient time for the carbon atoms of the thus melted pitch to be rearranged into $sp^2$ hybridized orbitals, thereby forming the carbon film on the surface of each silicon oxide granule.

According to the present disclosure, in step (a), the pitch has a softening point of not lower than 250° C., and has a carbon to hydrogen ratio ranging from 1.43 to 1.66. The pitch is present in an amount ranging from 1 part by weight to 10 parts by weight, based on 100 parts by weight of the silicon oxide granules. In addition, in step (b), the carbonization temperature ranges from 600° C. to 1100° C., and the carbon film formed on the surface of each of the silicon oxide granules has a thickness ranging from 0.5 μm to 2.0 μm.

In certain embodiments, in step (a), the pitch is present in an amount ranging from 3 parts by weight to 5 parts by weight, based on 100 parts by weight of the silicon oxide granules. In certain embodiments, in step (b), the carbonization temperature ranges from 600° C. to 900° C.

According to the present disclosure, in step (b), the negative electrode material particles are subjected to a filtering process after heating. In certain embodiments, the filtering process may be performed using a sieve, such that each of the negative electrode material particles has a mean particle size ranging from 2 μm to 11 μm.

The disclosure will be further described by way of the following examples. However, it should be understood that the following examples are solely intended for the purpose of illustration and should not be construed as limiting the disclosure in practice.

EXAMPLES

Example 1 (E1)

First, 1 part by weight of a powder of a pitch (Cat. no.: ZL250M; Manufacturer: Long Time Tech. Co., Ltd) was mixed with 100 parts by weight of silicon oxide granules (Cat. no.: SX-3; Manufacturer: Hengshui Chaofan New Energy Materials Co., Ltd) using a mass-produced sun type mixer with both internal and external rotation (Model no.: BT-50; Manufacturer: Pulian International Enterprise Co., Ltd.) in the absence of liquid organic solvents, so as to obtain a mixture of E1, followed by dividing the mixture of E1 into six portions. A total weight of each portion of the mixture of E1 was 20 kilograms. Next, the six portions of the mixture of E1 were respectively heated from 0° C. to a carbonization temperature of 600° C. (heating rate of 0.67° C./min), 700° C. (heating rate of 0.78° C./min), 800° C. (heating rate of 0.89° C./min), 900° C. (heating rate of 1.00° C./min), 1000° C. (heating rate of 1.11° C./min), and 1100° C. (heating rate of 1.22° C./min) within 15 hours, followed by maintaining each carbonization temperature for 5 hours, so that the pitch was carbonized and a carbon film was formed on a surface of each of the silicon oxide granules, thereby obtaining six batches of initial particles. Finally, the six batches of initial particles were respectively filtered using a sieve with a mesh number of 400 mesh, so as to obtain six batches of negative electrode material particles. To be specific, the six batches of the negative electrode material particles of E1 obtained at the carbonization temperature of 600° C., 700° C., 800° C., 900° C., 1000° C., and 1100° C., respectively, are referred to as Example 1a (E1a), Example 1b (E1b), Example 1c (E1c), Example 1d (E1d), Example 1e (E1e), and Example 1f (Elf).

Example 2 (E2)

The procedures for preparing the negative electrode material particles of E2 were similar to those of EX1, except that 2 parts by weight of the pitch was mixed with 100 parts by weight of the silicon oxide granules. To be specific, the six batches of the negative electrode material particles of E2 obtained at the carbonization temperature of 600° C., 700° C., 800° C., 900° C., 1000° C., and 1100° C., respectively, are referred to as Example 2a (E2a), Example 2b (E2b), Example 2c (E2c), Example 2d (E2d), Example 2e (E2e), and Example 2f (E2f).

Example 3 (E3)

The procedures for preparing the negative electrode material particles of E3 were similar to those of EX1, except that 3 parts by weight of the pitch was mixed with 100 parts by weight of the silicon oxide granules. To be specific, the six batches of the negative electrode material particles of E3 obtained at the carbonization temperature of 600° C., 700° C., 800° C., 900° C., 1000° C., and 1100° C., respectively, are referred to as Example 3a (E3a), Example 3b (E3b), Example 3c (E3c), Example 3d (E3d), Example 3e (E3e), and Example 3f (E3f).

Example 4 (E4)

The procedures for preparing the negative electrode material particles of E4 were similar to those of EX1, except that 4 parts by weight of the pitch was mixed with 100 parts by weight of the silicon oxide granules. To be specific, the six batches of the negative electrode material particles of E4 obtained at the carbonization temperature of 600° C., 700° C., 800° C., 900° C., 1000° C., and 1100° C., respectively, are referred to as Example 4a (E4a), Example 4b (E4b), Example 4c (E4c), Example 4d (E4d), Example 4e (E4e), and Example 4f (E4f).

It should be noted that in the procedures for preparing the negative electrode material particles of E4d, before the silicon oxide granules (i.e., SX-3) was mixed, and after the negative electrode material particles (i.e., E4d) was heated and filtered, the silicon oxide granules (i.e., SX-3) and the negative electrode material particles (i.e., E4d) were subjected to determination of particle size distribution (D10, D50, and D90) using a laser diffraction particle size analyzer (Manufacturer: Beckman Coulter Inc., Model no.: LS13320).

In addition, the thickness of the carbon film formed on the surface of each of the silicon oxide granules of E4d for each D10, D50, and D90 was calculated by substituting the detected particle size distribution (D10, D50, or D90) of SX-3 and E4d into the following Equation (1):

$$A = B - C \tag{1}$$

where A=thickness of the carbon film (μm)

B=D10, D50, or D90 of E4d

C=D10, D50, or D90 of SX-3

The results are shown in Table 1 below.

TABLE 1

| Particle size distribution (μm) | SX-3[1] | E4d[2] | Thickness of carbon film (μm) |
|---|---|---|---|
| D10 | 2.240 | 3.157 | 0.917 |
| D50 | 4.839 | 5.581 | 0.742 |
| D90 | 7.876 | 9.801 | 1.925 |

[1]The silicon oxide granules before being mixed

[2]The negative electrode material particles after being heated and filtered

Example 5 (E5)

The procedures for preparing the negative electrode material particles of E5 were similar to those of EX4, except that the mixture of E5 was heated from 0° C. to the carbonization temperature of 900° C. (heating rate of 0.71° C./min) within 21 hours, followed by maintaining the carbonization temperature for 5 hours. To be specific, the negative electrode material particles of E5 obtained at the carbonization temperature of 900° C. is referred to as Example 5 (E5).

Comparative Example 1 (CE1)

The silicon oxide granules described in Example 1 served as Comparative Example 1 (CE1).

Comparative Example 2 (CE2)

A silicon-carbon composite material (Cat. no. KSC-1265; Manufacturer: Shin-Etsu Chemical Co., Ltd) served as Comparative Example 2 (CE2).

Preparation of Negative Electrode

Materials

1. Negative electrode material:

The negative electrode material particles of a respective one of E1d, E2d, E3d, E4a, E4b, E4c, E4d, E4e, E4f, and E5, the silicon oxide granules of CE1 and the silicon-carbon composite material of CE2 were used as negative electrode material for preparing the negative electrode.

2. Carboxymethyl cellulose (abbreviated as CMC, Cat. no.: JSR-104A) used in the following experiments was purchased from JSR Corporation.
3. Carbon nanotubes (abbreviated as CNTs, Cat. no.: TUBALL BATT H2O SWCNT) used in the following experiments were purchased from Shenyang Kejing Auto-instrument Co., Ltd. and Shenyang East Chemical Science-Tech Co., Ltd.
4. Conductive carbon black (trade name: Super P) used in the following experiments was purchased from Timcal Ltd.
5. Styrene-butadiene rubber (abbreviated as SBR, Cat. no.: MAC350HC) used in the following experiments was purchased from Nippon Paper Industries Co., Ltd.

Methods

First, CMC, CNTs, and deionized water (DI water) were uniformly mixed, so as to obtain a mixture. The mixture was then divided into twelve portions. Next, conductive carbon black, the respective negative electrode material, SBR, and deionized water were sequentially added into each portion of the mixture, so as to form twelve conductive slurries. Finally, each of the conductive slurries was applied to a piece of copper foil with a thickness of 14 μm, followed by a drying treatment at 150° C. for 12 hours to remove deionized water from each of the conductive slurries, so as to obtain negative electrodes of CE1, CE2, E1d, E2d, E3d, E4a, E4b, E4c, E4d, E4e, E4f, and E5, respectively. Each of the negative electrodes includes the corresponding copper foil and a conductive film formed on thereon with a thickness ranging from 25 μm to 35 μm. Each conductive film includes 5.6 wt % of CMC, 0.3 wt % of CNTs, 12.0 wt % of conductive carbon black, 77.6 wt % of the corresponding negative electrode material, and 4.5 wt % of SBR.

Preparation of CR2032 Half-Cell (Button Cell)

A respective one of the negative electrodes of CE1, CE2, E1d, E2d, E3d, E4a, E4b, E4c, E4d, E4e, E4f, and E5 was used to prepare a CR2032 half-cell. In brief, the CR2032 half-cell was prepared by assembling each of the negative electrodes, a lithium metal foil serving as a positive electrode, an electrolyte, and a separator (Manufacturer: Celgard, Material: polypropylene (abbreviated as PP) and polyethylene (abbreviated as PE)). In particular, the electrolyte included 97 wt % of 1.2 M lithium hexafluorophosphate ($LiPF_6$) solution, 1 wt % of vinylene carbonate, and 2 wt % of propane sultone. The lithium hexafluorophosphate ($LiPF_6$) solution included lithium hexafluorophosphate ($LiPF_6$), ethylene carbonate (abbreviated as EC), ethyl methyl carbonate (abbreviated as EMC), and dimethyl carbonate (abbreviated as DMC). A volume ratio of EC, to EMC, and to DMC was 1:2:3. It should be noted that the CR2032 half-cells assembled from the negative electrodes of E1d, E2d, E3d, E4a, E4b, E4c, E4d, E4e, E4f, E5, CE1, and CE2, respectively, are referred to as Example 1D (E1D), Example 2D (E2D), Example 3D (E3D), Example 4A (E4A), Example 4B (E4B), Example 4C (E4C), Example 4D (E4D), Example 4E (E4E), Example 4F (E4F), Example 5 (E5), Comparative Example 1 (CE1), and Comparative Example 2 (CE2).

In addition, in order to verify charge capacity (i.e., fast charging capability), discharge capacity (i.e., fast discharging capability), initial Coulombic efficiency (abbreviated as ICE), a reproducibility of the ICE, or a cycle life test of the CR2032 half-cells of E1 D, E2D, E3D, E4A, E4B, E4C, E4D, E4E, E4F, and E5, the applicant cut each of the negative electrodes of E1d, E2d, E3d, E4a, E4b, E4c, E4d, E4e, E4f, and E5 into several pieces of negative electrode sheets before assembling each of the negative electrode sheets into the CR2032 half-cell, thereby obtaining several CR2032 half-cells of each E1D, E2D, E3D, E4A, E4B, E4C, E4D, E4E, E4F, and E5 after assembly.

The pitch content, heating rate, carbonization temperature, and duration of temperature rise of the negative electrode materials for these CR2032 half-cells of E1D, E2D, E3D, E4A, E4B, E4C, E4D, E4E, E4F, E5, CE1, and CE2 are summarized in Table 2 below.

TABLE 2

| CR2032 half-cell | Pitch content (part(s) by weight) | Heating rate (° C./min) | Carbonization temperature (° C.)[1] | Duration of temperature rise (hr) |
|---|---|---|---|---|
| E1D | 1 | 1 | 900 | 15 |
| E2D | 2 | 1 | 900 | 15 |
| E3D | 3 | 1 | 900 | 15 |
| E4A | 4 | 0.67 | 600 | 15 |
| E4B | 4 | 0.78 | 700 | 15 |
| E4C | 4 | 0.89 | 800 | 15 |
| E4D | 4 | 1 | 900 | 15 |
| E4E | 4 | 1.11 | 1000 | 15 |
| E4F | 4 | 1.22 | 1100 | 15 |
| E5 | 4 | 0.71 | 900 | 21 |
| CE1 | 0 | — | — | — |
| CE2 | — | — | — | — |

[1]Carbonization temperature was maintained for 5 hours.

Property Evaluation

A. CR2032 Half-Cell Performance Test

A respective four of the CR2032 half-cells of E4A, E4B, E4C, E4D, E4E, E4F, E5, and CE2 was subjected to determination of charge capacity (i.e., fast charging capability) using a charge-discharge test system (Manufacturer: Maccor Inc., Model no.: Series 4000). Another respective four of the CR2032 half-cells of E4A, E4B, E4C, E4D, E4E, E4F, and CE2 was subjected to determination of discharge capacity (i.e., fast discharging capability) using the charge-discharge test system. In particular, test conditions were classified into general test conditions and stringent test conditions. Under the general test conditions, a test temperature was set at 25° C., a charge cut-off voltage was 0.01 V and a discharge cut-off voltage was 1.8 V. Under the stringent test conditions, a test temperature was set at 25° C., a charge cut-off voltage was 0 V and a discharge cut-off voltage was 1.2 V. It should be noted that the initial Coulombic efficiency (abbreviated as ICE) for still another respective one of the CR2032 half-cells of E1D, E2D, E3D, E4A, E4B, E4C, E4D, E4E, E4F, and CE2 was determined by calculating the first cycle charge capacity and discharge capacity at a C-rate of 0.1 C. In addition, to verify the reproducibility of the ICE of the CR2032-cells of E4D, still yet another three of the CR2032-cells of E4D (identified as 1, 2, and 3) were subjected to determination of ICE. The cycle life test for yet another respective one of the CR2032 half-cells of E4A, E4B, E4C, E4D, E4E, E4F, E5, and CE2 was performed under the stringent test conditions at room temperature and at a C-rate of 0.5 C, so as to obtain a cycle number.

The ICE for three of the CR2032 half-cells of E4D (identified as 1, 2, and 3) under the general test conditions are shown in Table 3 below.

TABLE 3

| CR2032 half-cell | Identification number | $1^{st}$ cycle charge capacity (mAh/g) | $1^{st}$ cycle discharge capacity (mAh/g) | ICE (%) |
|---|---|---|---|---|
| E4D[1] | 1 | 2212 | 1734 | 78.40 |
| | 2 | 2138 | 1674 | 78.30 |
| | 2 | 2203 | 1728 | 78.44 |

[1]4 parts by weight of the pitch and at the carbonization temperature of 900° C.

Referring to Table 3, the CR2032 half-cells of E4D with identification numbers 1, 2, and 3 achieved ICE of 78.40%, 78.30%, and 78.44%, respectively, under the general test conditions, indicating that the reproducibility of the ICE for the CR2032 half-cell of E4D was consistent.

The ICE for the CR2032 half-cells of E4A, E4B, E4C, E4D, E4E, and E4F under the stringent test conditions are shown in Table 4 below.

TABLE 4

| CR2032 half-cell | Carbonization temperature (° C.) | $1^{st}$ cycle charge capacity (mAh/g) | $1^{st}$ cycle discharge capacity (mAh/g) | ICE (%) |
|---|---|---|---|---|
| E4A[1] | 600 | 2043 | 1344 | 65.80 |
| E4B[1] | 700 | 2123 | 1356 | 63.90 |
| E4C[1] | 800 | 2145 | 1433 | 66.81 |
| E4D[1] | 900 | 2208 | 1606 | 72.74 |
| E4E[1] | 1000 | 1960 | 1397 | 71.28 |
| E4F[1] | 1100 | 1905 | 1391 | 73.02 |

[1]4 parts by weight of the pitch

Referring to Table 4, the CR2032 half-cells of E4A, E4B, E4C, E4D, E4E, and E4F achieved ICE of 65.80%, 63.90%, 66.81%, 72.74%, 71.28%, and 73.02%, respectively, under the stringent test conditions, indicating that when 4 parts by weight of the pitch (based on 100 parts by weight of the silicon oxide granules) was used to prepare the negative electrode material particles, the negative electrode material particles synthesized at higher carbonization temperatures resulted in the CR2032 half-cells having a higher ICE.

As shown in FIG. 1, with regard to the relationship between the capacity retention and the charge C-rate (under the stringent test conditions), the capacity retention of the respective four of the CR2032 half-cells of E4A, E4B, E4C, E4D, E4E, and E4F gradually decreased with increasing charge C-rate. However, as shown in FIG. 2, with regard to the relationship between the capacity retention and the discharge C-rate (under the stringent test conditions), the CR2032 half-cell of E4A maintained the capacity retention of approximately 70% at the discharge C-rate of 3 C, and the respective one of the CR2032 half-cells of E4B, E4C, E4E, and E4F maintained the capacity retention of approximately 80% at the discharge C-rate of 3 C. Furthermore, the CR2032 half-cell of E4D had an even higher capacity retention of not lower than 90% at the discharge C-rate of 3 C. These results demonstrate that by virtue of the carbonization temperature of 900° C., the negative electrode material particles (i.e., E4d) prepared from the method of the present disclosure can exhibit an optimal performance when assembled into the CR2032 half-cell (i.e., E4D).

Figure 3:
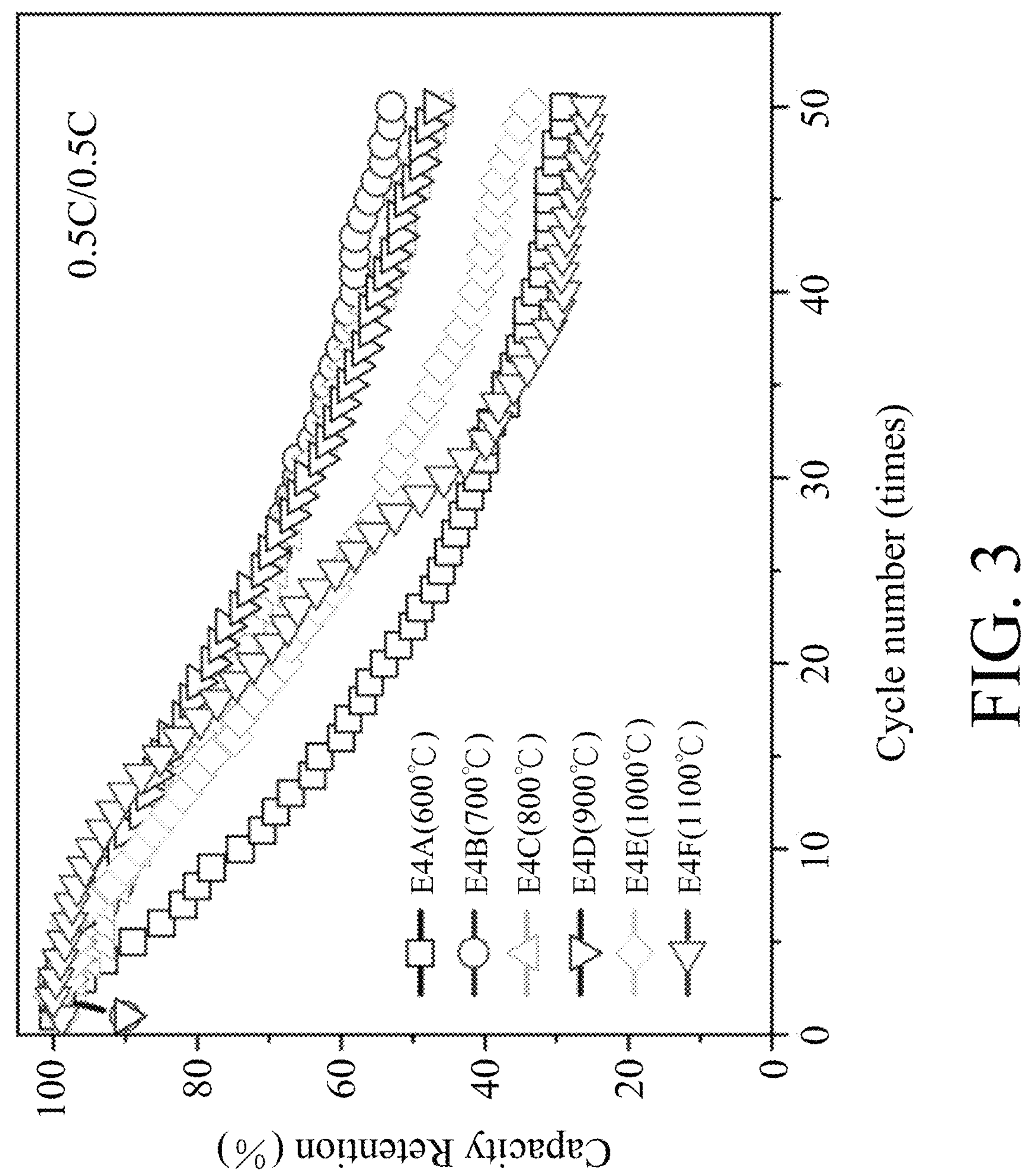
FIG. 3 is a graph showing the relationship between the capacity retention and the cycle number for CR2032 half-cells of E4A, E4B, E4C, E4D, E4E, and E4F, infra.

As further shown in FIG. 3, with regard to the relationship between the capacity retention and the cycle number (under the stringent test conditions), when the capacity retention was 80%, the corresponding cycle number for the respective one of the CR2032 half-cells of E4B, E4C, E4D, and E4F ranged from 17 times to 19 times. In addition, when the cycle number reached 50 times, the corresponding capacity retention for the respective one of the CR2032 half-cells of E4B, E4C, and E4D was not lower than 45%. Conversely, when the cycle number reached 50 times, the corresponding capacity retention for the respective one of the CR2032 half-cells of E4A, E4E, and E4F all dropped to not higher than 35%. These results indicate that by virtue of the carbonization temperature ranging from 700° C. to 900° C., the negative electrode material particles (i.e., E4b, E4c, and E4d) prepared from the method of the present disclosure can exhibit better cycle life performance when assembled into the CR2032 half-cells (i.e., E4B, E4C, and E4D).

Figure 4:
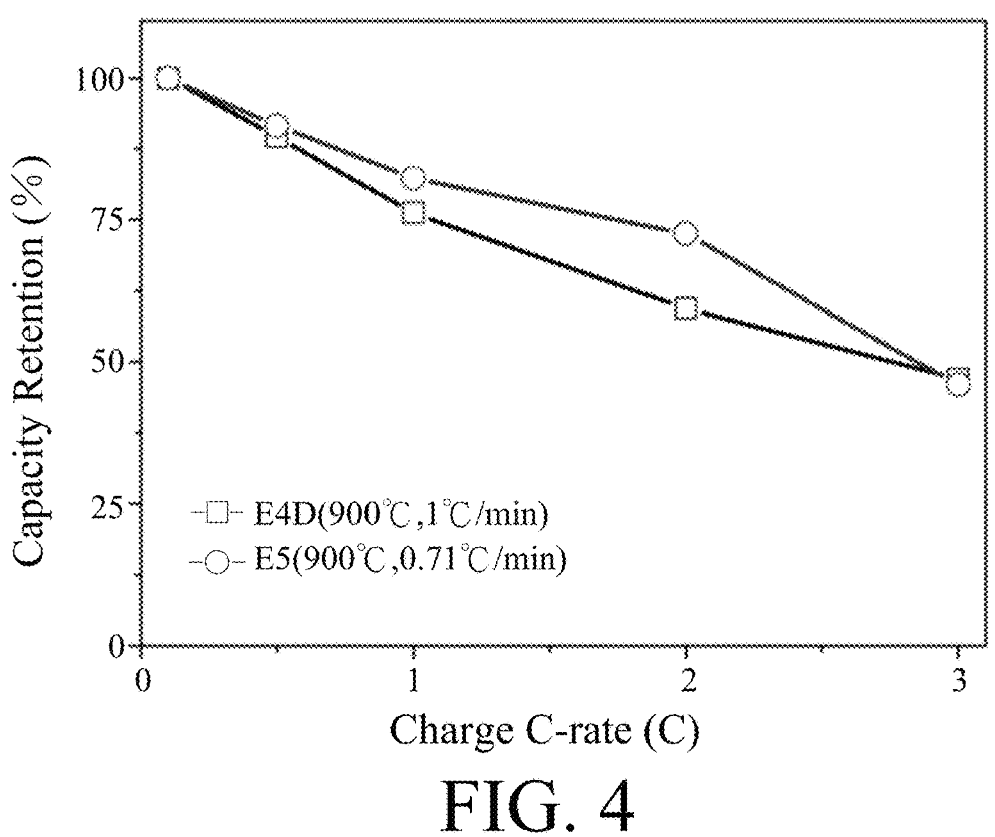
FIG. 4 is a graph showing the relationship between the capacity retention and the charge C-rate for CR2032 half-cells of E4D and E5, infra.
Figure 5:
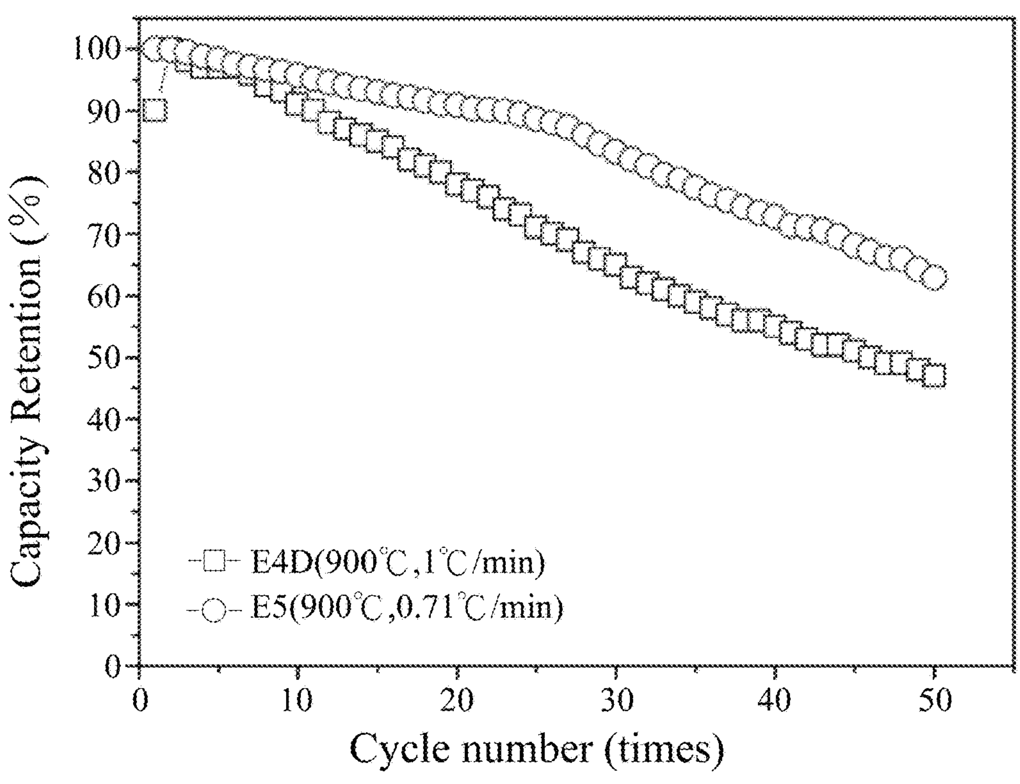
FIG. 5 is a graph showing the relationship between the capacity retention and the cycle number for CR2032 half-cells of E4D and E5, infra.

As shown in FIG. 4, with regard to the relationship between the capacity retention and the charge C-rate (under the stringent test conditions), the capacity retentions of both the CR2032 half-cells of E4D and E5 decreased with increasing charge C-rate, and the capacity retention of the CR2032 half-cells of E5 was superior to that of the CR2032 half-cells of E4D. As shown in FIG. 5, with regard to the relationship between the capacity retention and the cycle number (under the stringent test conditions), when the capacity retention was 80%, the corresponding cycle number for the respective one of the CR2032 half-cells of E4D and E5 was 19 times and 33 times. In addition, when the cycle number reached 50 times, the corresponding capacity retention for the respective one of the CR2032 half-cells of E4D and E5 was not lower than 45% and 60%. These results demonstrate that when the carbonization temperature of 900° C. is used to prepare the negative electrode material particles, the negative electrode material particles of E5 synthesized at a heating rate of 0.71° C./min resulted in the CR2032 half-cell of E5 exhibiting a better cycle life performance than the CR2032 half-cell of E4D which was assembled with the negative electrode made from the negative electrode material particles of E4d that was synthesized at a heating rate of 1.00° C./min.

The ICE for the CR2032 half-cells of E1 D, E2D, E3D, E4D, and CE2 under the stringent test conditions are shown in Table 5 below.

TABLE 5

| CR2032 half-cell | Pitch content (part(s) by weight) | Carbonization temperature (° C.) | $1^{st}$ cycle charge capacity (mAh/g) | $1^{st}$ cycle discharge capacity (mAh/g) | ICE (%) |
|---|---|---|---|---|---|
| E1D | 1 | 900 | 2154 | 1519 | 70.50 |
| E2D | 2 | 900 | 2244 | 1598 | 71.20 |
| E3D | 3 | 900 | 2283 | 1620 | 71.00 |
| E4D | 4 | 900 | 2208 | 1606 | 72.74 |
| CE2[1] | — | — | 2142 | 1539 | 71.80 |

[1]KSC-1265 as the negative electrode material that was commercially available

Referring to Table 5, the CR2032 half-cells of E1 D, E2D, E3D, E4D, and CE2 achieved ICE of 70.50%, 71.20%, 71.00%, 72.74%, and 71.80%, respectively, all exceeding 70%, under the stringent test conditions. These results indicate that the negative electrode material particles synthesized with a higher pitch content resulted in the CR2032 half-cells having a higher ICE. In addition, the ICE for the CR2032 half-cell of E4D even exceeded that of the CR2032 half-cell of CE2 which was assembled with the negative electrode made from commercially available KSC-1625 negative electrode material.

Figure 6:
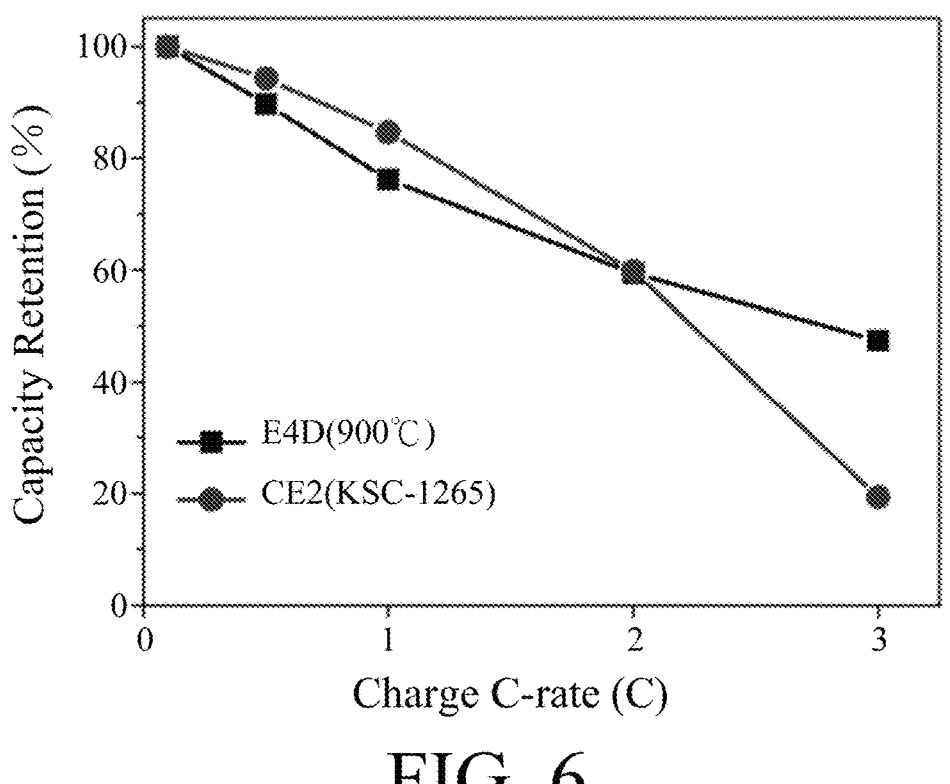
FIG. 6 is a graph showing the relationship between the capacity retention and the charge C-rate for CR2032 half-cells of E4D and CE2, infra.
Figure 7:
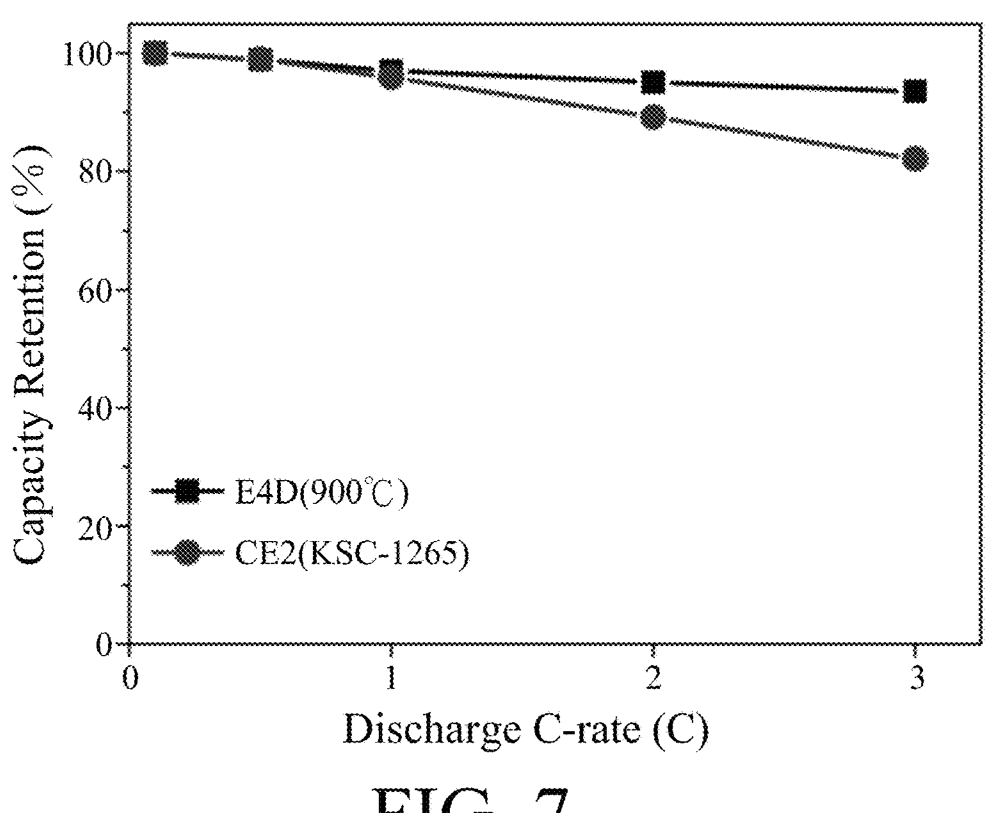
FIG. 7 is a graph showing the relationship between the capacity retention and the discharge C-rate for CR2032 half-cells of E4D and CE2, infra.

As shown in FIG. 6, with regard to the relationship between the capacity retention and the charge C-rate (under the stringent test conditions), although a fast charging capability of the CR2032 half-cells of E4D before the charge C-rate of 2 C was slightly lower by approximately 5% than that of the CR2032 half-cells of CE2, the fast charging capability of the CR2032 half-cell of E4D at the charge C-rate of 3 C was approximately 20% higher than that of the CR2032 half-cell of CE2. In addition, as shown in FIG. 7, with regard to the relationship between the capacity retention and the discharge C-rate (under the stringent test conditions), although a fast discharging capability of the CR2032 half-cells of E4D before the discharge C-rate of 0.5 C was close to that of the CR2032 half-cells of CE2, the fast discharging capability of the CR2032 half-cells of E4D after the discharge C-rate of 1 C was higher than that of the CR2032 half-cells of CE2. In particular, the fast discharging capability of the CR2032 half-cell of E4D at the discharge C-rate of 3 C was approximately 10% higher than that of the CR2032 half-cell of CE2 with the corresponding capacity retention for the CR2032 half-cell of E4D remaining approximately 93%.

Figure 8:
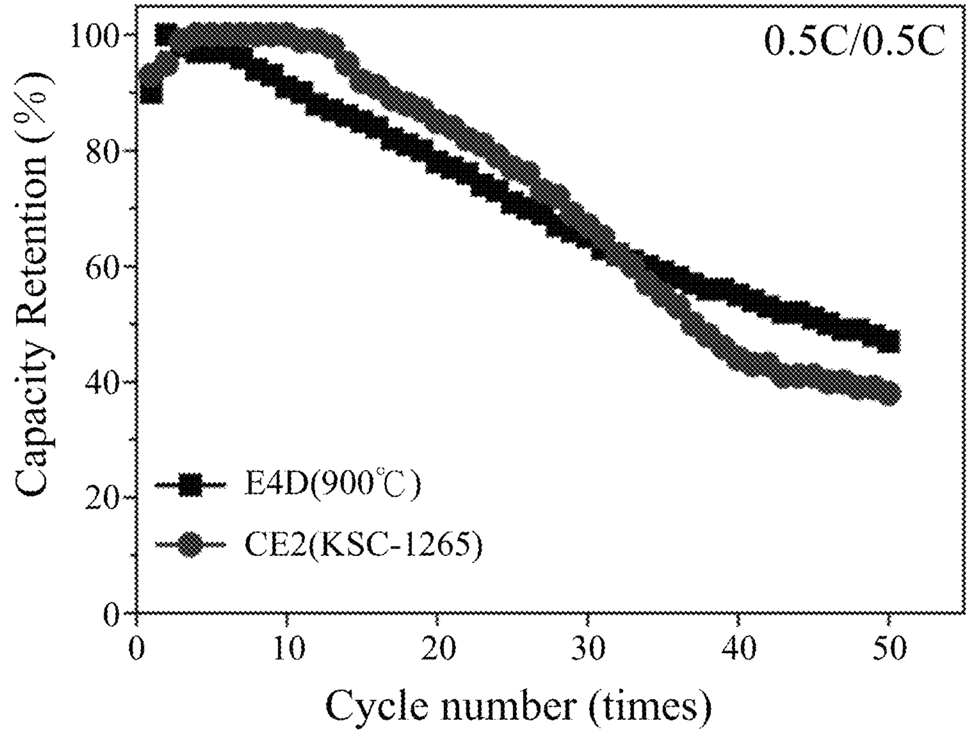
FIG. 8 is a graph showing the relationship between the capacity retention and the cycle number for CR2032 half-cells of E4D and CE2, infra.

As shown in FIG. 8, with regard to the relationship between the capacity retention and the cycle number (under the stringent test conditions), although the capacity retention of the CR2032 half-cell of E4D before the cycle number of approximately 35 times was slightly lower than that of the CR2032 half-cell of CE2, the capacity retention of the CR2032 half-cell of E4D after the cycle number of 35 times was higher than that of the CR2032 half-cell of CE2. In addition, the capacity retention of the CR2032 half-cell of E4D at the cycle number of 50 times was approximately 10% higher than that of the CR2032 half-cell of CE2.

Figure 9:
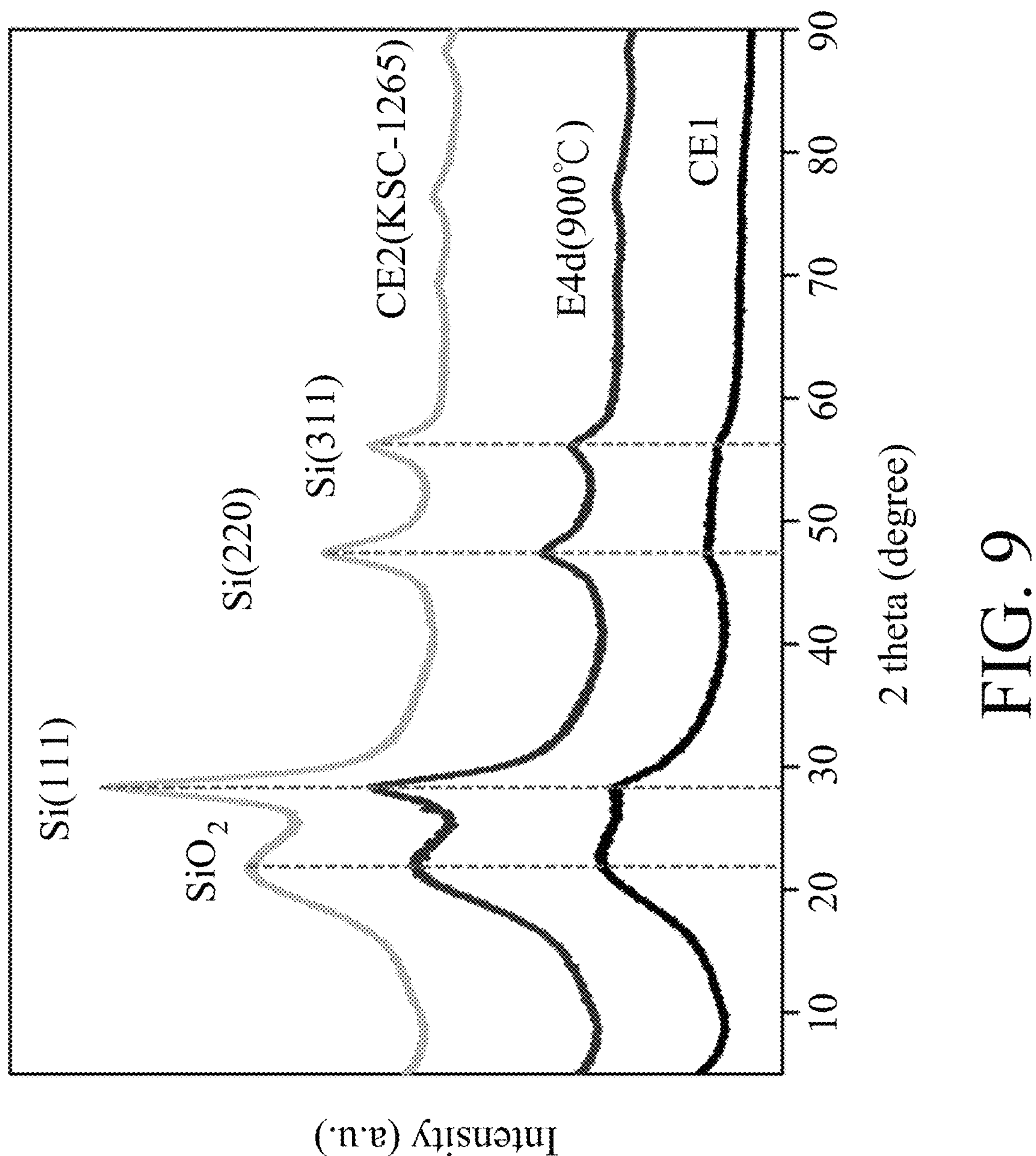
FIG. 9 is a graph showing the X-ray diffraction (abbreviated as XRD) patterns for negative electrode materials of E4d, CE1, and CE2, infra.

Moreover, the negative electrode materials of E4d and CE2 were further subjected to X-ray diffraction (XRD) analysis, and the thus obtained XRD patterns are shown in FIG. 9. As shown in FIG. 9, the negative electrode material of E4d showed three diffraction signal peaks of Si (111), Si (220), and Si (311) at approximately 28 degrees, 47 degrees, and 56 degrees, respectively. In addition, the negative electrode material of CE2 showed higher intensities in the aforesaid three diffraction signal peaks than those of the negative electrode material of E4d. It should be noted that a volume expansion of silicon crystal alloyed with lithium metal is approximately 2 times to 2.5 times higher than that of silicon oxide alloyed with lithium metal. Therefore, silicon crystal exhibits a relatively lower capacity to withstand volume expansion compared to silicon oxide. The aforesaid results shown in FIG. 9 are consistent with the results shown in FIG. 8, indicating that because the negative electrode material of CE2 (i.e., commercially available KSC-1265) contained silicon crystal, the capacity retention of the CR2032 half-cell of CE2, which was assembled with the negative electrode made from the negative electrode material of CE2, at the cycle number of 50 times was approximately 10% lower than that of the CR2032 half-cell of E4D.

Figure 10:
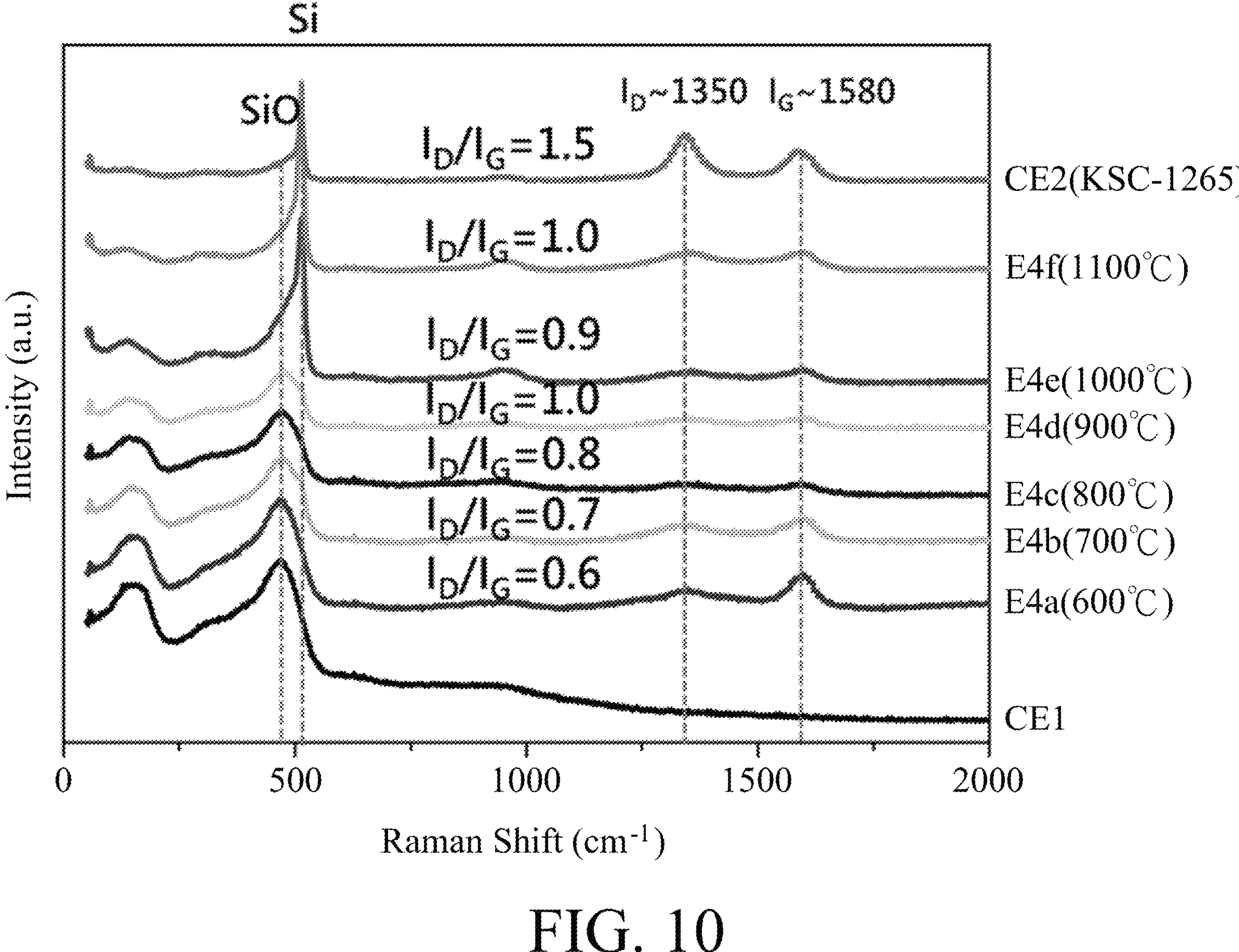
FIG. 10 is a graph showing the Raman spectra for negative electrode materials of E4a, E4b, E4c, E4d, E4e, E4f, CE1, and CE2, infra.

In addition, the negative electrode materials of E4a, E4b, E4c, E4d, E4e, E4f, and CE2 were further subjected to Raman spectroscopy, and the thus obtained Raman spectra are shown in FIG. 10. As shown in FIG. 10, the $I_D/I_G$ ratio determined in each of the negative electrode materials of E4a, E4b, E4c, E4d, E4e, and E4f was not greater than 1.0, while the $I_D/I_G$ ratio determined in the negative electrode material of CE2 reached 1.5. These results demonstrate that a defect content in the carbon film of the negative electrode material of E4d is lower than that of the negative electrode material of CE2. The aforesaid results shown in FIG. 10 are consistent with the results shown in FIGS. 6 and 7, indicating that the CR2032 half-cell of E4D, which is assembled with the negative electrode made from the negative electrode material of E4d, has superior fast charging capability and fast discharging capability compared to those of the CR2032 half-cell of CE2.

Summarizing the above test results, it is clear that the method for manufacturing negative electrode material particles of the present disclosure eliminates the necessity of use of the organic solvents in step (a), which not only minimizes the associated material costs but also reduces the time spent on a suction filtration to remove the organic solvents, thereby facilitating efficient mass production. Furthermore, even without the use of the organic solvents, the CR2032 half-cell which is assembled with the negative electrode made from the negative electrode material particles prepared from the method of the present disclosure can exhibit excellent performance (i.e., the fast charging capability and the fast discharging capability).

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for manufacturing negative electrode material particles, comprising the steps of:

(a) mixing silicon oxide granules with a powder of a pitch without using any liquid organic solvents, so as to obtain a mixture; and (b) heating the mixture at a heating rate of 0.71° C./min to a carbonization temperature of 900° C., followed by maintaining the carbonization temperature for 5 hours, so that the thus melted pitch is carbonized and forms a carbon film on a surface of each of the silicon oxide granules, thereby obtaining the negative electrode material particles, wherein in step (a), the silicon oxide granules have a D10 particle size of 2.240 μm, a D50 particle size of 4.839 μm, and a D90 particle size of 7.876 μm, the pitch has a D10 particle size ranging from 0.5 μm to 2.0 μm, a D50 particle size ranging from 2 μm to 4 μm, and a D90 particle size ranging from 5 μm to 9 μm, the pitch having a softening point of not lower than 250° C., and a carbon to hydrogen ratio ranging from 1.43 to 1.66, and the pitch is present in an amount of 4 parts by weight based on 100 parts by weight of the silicon oxide granules, and wherein in step (b), each of the negative electrode material particles has a mean particle size ranging from 2 μm to 11 μm.

2. The method as claimed in claim 1, wherein in step (b), the negative electrode material particles are subjected to a filtering process after heating so as to obtain the negative electrode material particles having a mean particle size ranging from 2 μm to 11 μm.

3. The method as claimed in claim 1, wherein in step (b), the carbon film formed on the surface of each of the silicon oxide granules has a thickness ranging from 0.5 μm to 2.0 μm.

* * * * *